United States Patent
Ferres et al.

(10) Patent No.: US 6,820,015 B2
(45) Date of Patent: Nov. 16, 2004

(54) METHOD AND INSTALLATION FOR PREDICTING THE MAXIMUM RUNNING DISTANCE, IN DEGRADED MODE, OF A MOUNTED ASSEMBLY

(75) Inventors: Laurent Ferres, Rouset (FR); Daniel Thiallier, Lezoux (FR)

(73) Assignee: Michelin Recherche et Technique S.A., Granges-Paccott (CH)

( * ) Notice: Subject to any disclaimer, the term of this patent is extended or adjusted under 35 U.S.C. 154(b) by 0 days.

(21) Appl. No.: 10/384,863

(22) Filed: Mar. 10, 2003

(65) Prior Publication Data

US 2004/0002820 A1 Jan. 1, 2004

Related U.S. Application Data

(63) Continuation of application No. PCT/EP02/03230, filed on Mar. 22, 2002.

(30) Foreign Application Priority Data

Apr. 5, 2001 (FR) .............................................. 01 04764

(51) Int. Cl.$^7$ ................................. G01B 3/44; G01B 3/52
(52) U.S. Cl. ................................................................ 702/34
(58) Field of Search ............................ 702/34, 35, 145, 702/148, 163, 174, 181, 182; 73/146; 152/155, 157, 158, 512, 520

(56) References Cited

U.S. PATENT DOCUMENTS

| | | | |
|---|---|---|---|
| 3,563,088 A | 2/1971 | Sperberg | 73/146 |
| 4,442,879 A | 4/1984 | Uemura | 152/205.14 |
| 4,762,158 A | 8/1988 | Furuya et al. | 152/454 |
| 4,815,004 A | 3/1989 | Beebe | 702/41 |
| 5,103,595 A | 4/1992 | Dale et al. | 451/5 |
| 5,151,141 A | 9/1992 | Lunieski et al. | 152/544 |
| 5,749,984 A | 5/1998 | Frey et al. | 152/415 |
| 5,836,366 A | 11/1998 | Muhlhoff | 152/379.3 |
| 6,212,947 B1 | 4/2001 | Shimizu et al. | 73/146 |
| 6,269,690 B1 | 8/2001 | Shimizu et al. | 73/146 |

FOREIGN PATENT DOCUMENTS

| | | |
|---|---|---|
| EP | 0955534 | 11/1999 |
| FR | 2720977 | 12/1995 |
| JP | 0326144 | 11/1999 |
| WO | 0076791 | 12/2000 |

OTHER PUBLICATIONS

Patent Abstract of Japan for Publication No. 03082931, Aug. 2001.

*Primary Examiner*—Michael Nghiem
(74) *Attorney, Agent, or Firm*—Fitzpatrick, Cella, Harper & Scinto

(57) ABSTRACT

The present invention concerns a method and an installation for predicting the maximum running distance in degraded mode, without substantial deterioration in the running, of a mounted assembly including a rim, a safety support and a tire mounted on the rim. The method according to the invention includes running the mounted assembly at a reduced or zero inflation pressure or the support mounted on the rim, from a time $t_0$, at a given load and with a constant speed V, on at least one running surface so that the center (C) of the rim is a point which is substantially invariant during the running, monitoring the variation in a variable R representing the radial loading of the support as a function of the running time t.

13 Claims, 5 Drawing Sheets

METHOD AND INSTALLATION FOR PREDICTING THE MAXIMUM RUNNING DISTANCE, IN DEGRADED MODE, OF A MOUNTED ASSEMBLY

CROSS REFERENCE TO RELATED APPLICATIONS

This is a continuation of international application PCT/EP02/03230 filed Mar. 22, 2002, which was published in French on Oct. 17, 2002 as international publication WO 02/082039 and which claims priority of French application 01/04764 filed Apr. 5, 2001.

BACKGROUND OF THE INVENTION

1. The Field of the Invention

The present invention concerns a method of predicting the maximum running distance in degraded mode, without substantial deterioration in the running conditions, of a mounted assembly comprising a wheel rim, a safety support mounted on the rim, and a tire cover mounted on the rim, with the support supporting the tread of the cover during such running. (Running "in degraded mode" means running at reduced or zero inflation pressure.) The invention also concerns an installation for implementing this method.

2. The Related Art

It is known that the safety supports for vehicle tires are intended to be mounted on a rim inside a tire, with a view to being able to support the tread of the tire in the event of loss of inflation pressure. These supports comprise, notably, a base which is intended to be mounted on the rim, and a crown which is intended to come into contact with the tread in the aforementioned case (loss of inflation pressure) and which leaves clearance with respect to it at nominal pressure.

The international patent document WO-A-00/76791 (United States Published Application US 2002/0124924 A1, the disclosure of which is hereby incorporated herein for all purposes) presents such a support, in which the base and crown are substantially cylindrical, and which also comprises an annular body connecting the base and the crown. This annular body comprises a support element which is continuous circumferentially with a circumferential mid-plane. The support element comprises a plurality of partitions extending axially on each side of the circumferential mid-plane and distributed over the circumference of the support.

The tests or methods used at the present time for predicting the maximum running distance in degraded mode, without substantial deterioration of the running conditions, of a mounted assembly comprising a wheel rim provided with such a safety support and a tire cover mounted on the rim consist generally of:

running a motor vehicle equipped with such mounted assemblies in degraded mode on a circuit of the road or motorway type, at a predetermined constant speed (for example around 100 km/h) and at a given external temperature, and then interrupting the running when the driver of the vehicle detects such a substantial deterioration of the running conditions that continued running in degraded mode is very difficult, a deterioration which is due to significant damage to the mounted assemblies and which results, for example, in a substantial increase in the vibration originating at the steering wheel, or following an examination of each mounted assembly following running flat over predetermined distances.

Generally, the criterion for stopping the running test in degraded mode, which is chosen by the operator in charge of the test, corresponds to the appearance of one or more specific items of damage concerning both the safety support and the tire cover.

The damage concerning the support can, for example, consist of cracks or breaks at the partitions of the support because of significant internal heating and buckling stresses to which the running support is subjected in degraded mode.

The damage concerning the tire cover can, for example, consist of cuts at the sidewalls of the tire cover, notably because of the camber stresses to which the tire cover is subjected on a more or less winding circuit, or by a burst pure and simple thereof, making it impossible to continue any running in degraded mode.

However, experience shows that these stoppage criterion or criteria are parameters that can have a determining effect on the result with regard to the maximum running distance in degraded mode without substantial deterioration in the running conditions, which is obtained at the end of the test on a circuit.

The same applies to the parameters characterizing the running which are peculiar to the vehicle, such as the speed chosen for the running or the load to which each mounted assembly is subjected during running.

Naturally, the parameters relating to the ambient air (temperature) and to the surface of the circuit used (roughness, dry or wet ground) may also have an influence on the maximum running distance obtained in degraded mode.

A major drawback of these prediction tests on a circuit lies in the difficulty of keeping the aforementioned parameters identical from one test to another because of their variability, and in the more or less constraining character of these parameters for the support and tire cover during running in degraded mode. This may result, in particular, in difficulties in comparing the respective running endurances of various mounted assemblies in degraded mode.

SUMMARY OF THE INVENTION

An object of the present invention is to propose a method of predicting the maximum running distance in degraded mode, without substantial deterioration of the running conditions (that is to say without loss of control of the vehicle), of a mounted assembly comprising a wheel rim, a safety support mounted on the rim, and a tire cover mounted on the rim around the support, with the support supporting the tread of the cover during the running, which makes it possible reliably and reproducibly to predict the maximum running distances in degraded mode of various mounted assemblies and to compare them with each other under identical experimental conditions.

To this end and according to a first embodiment of the invention, the prediction method comprises running the mounted assembly at a reduced or zero inflation pressure, from a time $t_0$, at a given temperature, at a given mode and at a constant speed V, on at least one running surface so that the center of the wheel rim is a substantially invariant point during the running (i.e. on a rolling road test drum, typically), monitoring the variation in a variable R representing the radial loading of the support as a function of the reduced or zero pressure running time t, and, during such running, implementing the following sequence of steps (i) to (iii):

(i) determining a value $R_1$ attained by the variable R at the end of a predetermined stabilization time $t_1$ which is such that the direction of variation of the variable R represents a radial loading of the support increasing overall beyond the stabilization time $t_1$, then (ii) determining a critical running time $t_2$ ($t_2 > t_1$) at the end of which the variable R reaches a critical value $R_2$ such that $R_2 = R_1 + \Delta R$, where $\Delta R$ is a value representing a critical increase in the loading of the support with respect to the value $R_1$ at the end of the stabilization time $t_1$, and then (iii) making the running time $t_2$ correspond to a distance $d_2$, with $d_2 = V(t_2 - t_0)$, representing a prediction of the maximum running distance without substantial deterioration in the running conditions.

It should be noted that the value $\Delta R$ which is adopted at step (ii) constitutes a criterion for stopping the running, beyond which the support is subjected to stresses and heating liable to make it unsuitable for use.

It should also be noted that it would be possible to choose at least one new critical value $\Delta R'$ greater than or less than $\Delta R$ according to the absence or presence of substantial damage in the support at the end of the time $t_2$, and once again to implement the sequence of steps (i) to (iii) by replacing $\Delta R$ with $\Delta R'$, so as to obtain, at the end of n iterations, a still further improved prediction of the maximum running distance of the support without substantial deterioration in the running conditions.

According to a second embodiment of the invention, the method of predicting the maximum running distance of the mounted assembly at a reduced or zero inflation pressure, without substantial deterioration in the running conditions, comprises running the support mounted on the wheel rim, also at a given temperature, at a given load and with a constant speed V, directly in contact with the running surface so that the center of the rim is a substantially invariant point during the running, monitoring the variation in the variable R representing the radial loading of the support as a function of the reduced or zero pressure running time t, and, during this running, implementing the aforementioned steps (i), (ii) and (iii).

Preferably, the support is mounted on the rim by snapping on, in this second mode.

According to a preferred example of implementation of the invention which is common to these two embodiments, the predetermined value $\Delta R$ is such that, at the time $t_2$, the rate of increase $|dR/dt|$ in the loading of the support is greater than a given critical threshold.

According to another characteristic of the invention common to these two embodiments (i.e. running of the mounted assembly or only of the support on the running surface), step (ii) above comprises monitoring the variation in the variable R from the time $t_1$, and predicting that it attains the critical value $R_2$ at the critical time $t_2$ substantially when the instantaneous acceleration of the loading $d^2R/dt^2$ of the support passes through a zero value.

It should be noted that this critical time $t_2$ is such that the graph of the variable R exhibits a reversal point substantially at the time $t_2$, that is to say, a reversal of the direction of variation in the slope $dR/dt$ for $t > t_2$, representing a higher and higher rate of loading of the support which rapidly results in the aforementioned cracking or rupture of the support.

Concerning the first embodiment of the invention, the variable R representing the radial loading of the support advantageously corresponds to the mean radius of the support during loading (also referred to as the "loaded radius"), such radius being measured between a first point defined in the center of the wheel rim and a second point defined in the center of the contact surface between the tread and the running surface.

Concerning the second embodiment of the invention, this variable R also corresponds to the mean radius during loading, except that this radius is here measured between a first point defined in the center of the wheel rim and a second point defined in the center of the contact surface between the radially external face of the support and the running surface.

It should be noted that the direction in variation of these radii during loading decreases overall as a function of the running time t, beyond the stabilization time $t_1$.

It should also be noted that the variable R could also correspond to the flexion relating to the support because of the loading, or to the relative loading of the support (the ratio of the flexion to the height of the support), the direction of variation of this flexion or this relative loading increasing overall as a function of the time t, beyond the stabilization time $t_1$.

According to another advantageous characteristic of the invention concerning solely the aforementioned first embodiment, the prediction method also comprises estimating that the maximum running distance without substantial deterioration in the running conditions is reached just before smoke is detected inside the mounted assembly.

According to one advantageous embodiment of the invention common to the aforementioned two embodiments, the running surface used has a substantially cylindrical geometry, and comprises, for example, a rolling road test drum, i.e., one whose running surface is a cylinder with a circular cross section. It should be noted that this running surface can be convex or concave, depending on whether the external or internal face of the test drum, respectively, is used.

According to another exemplary embodiment of the invention common to the aforementioned two embodiments, the running surface used has a substantially flat geometry, for example, of the conveyer belt type.

Concerning one or other of these exemplary embodiments of the invention, it should be noted that the running surface used can be smooth, or have a plurality of projecting and/or recessed irregularities which are more or less regularly spaced apart on its perimeter. These irregularities can, for example, consist of obstacles of the bar type, intended to reproduce the running stresses due to manhole covers or other reliefs normally encountered during actual running on a road, or hollows, intended, for example, to reproduce the stresses inherent in running over potholes.

According to one advantageous exemplary embodiment of the invention, the wheel rim has at each of its peripheral edges a rim seat intended to receive a bead on the tire cover, the wheel rim having between its two seats, on the one hand, a surface intended to receive the support and, on the other hand, a mounting groove connecting the surface to an axially internal flange on one of the seats.

Reference can be made to the French patent document FR-A-2 720 977 (U.S. Pat. No. 5,836,366, the disclosure of which is hereby incorporated by reference for all purposes) for a detailed description of the mounting of the tire cover on the rim.

As for the support according to the invention, it is advantageously of the type having:
  a substantially cylindrical base intended to be mounted on the rim,
  a substantially cylindrical crown intended to come into contact with the tread of the tire cover in the event of a drop in pressure, and leaving a clearance with respect to the tread at nominal pressure, and
  an annular body connecting together the base and the crown, the body having a circumferentially continuous support element with a circumferential mid-plane, the support element comprising a plurality of partitions extending axially on each side of the circumferential mid-plane and distributed over the circumference of the support.

An installation according to the invention for implementing the aforementioned prediction method according to the first or second embodiments comprises essentially at least one running surface, and one or more running stations which are each intended for the running on the running surface of a mounted assembly comprising a tire cover mounted on a wheel rim around a safety support with a reduced or zero inflation pressure, or for the running on the running surface of a support mounted on a wheel rim, the center of the mounted assembly or of the support being a point which is substantially invariant during the running on the running surface or surfaces, wherein such installation also comprises:

detection means connected to the running station or stations and which are designed to detect at all times, during the running on the surface or surfaces, the information representing the effects caused by the running, including at least one item of information representing the radial loading of the support at all times, and a unit for controlling the starting of the running according to predetermined running parameters, including a running speed V and a load to be applied to the support during running, in order to receive the information from the detection means and to store it, and to control the stopping of the running if at least one of the items of information reaches a predetermined critical value.

According to another characteristic of the invention, the detection means comprises a loading sensor, for example of the potentiometric type, which is designed to provide at all times a value of the support radius during loading which represents the mean radial loading of the support during running, such radius during loading being measured between a first point defining the center of the wheel rim and a second point defining the center of the contact surface between the cover, or the support according to circumstances, and the running surface.

Preferably, in the case of a running of the mounted assembly on the running surface, the detection means also comprise a smoke detector which is designed to detect the presence of smoke through internal heating inside the mounted assembly during running at reduced or zero pressure, by suction means which are provided inside the running station in order to suck the, air included inside the mounted assembly in the direction of the detector.

BRIEF DESCRIPTION OF THE DRAWINGS

The aforementioned characteristics of the present invention, as well as others, will be better understood from a reading of the following description of several exemplary embodiments of the invention, given by way of illustration and non-limitingly, the description being given in relation to the accompanying drawings, in which.

DESCRIPTION OF EXEMPLARY EMBODIMENTS

Figure 1:
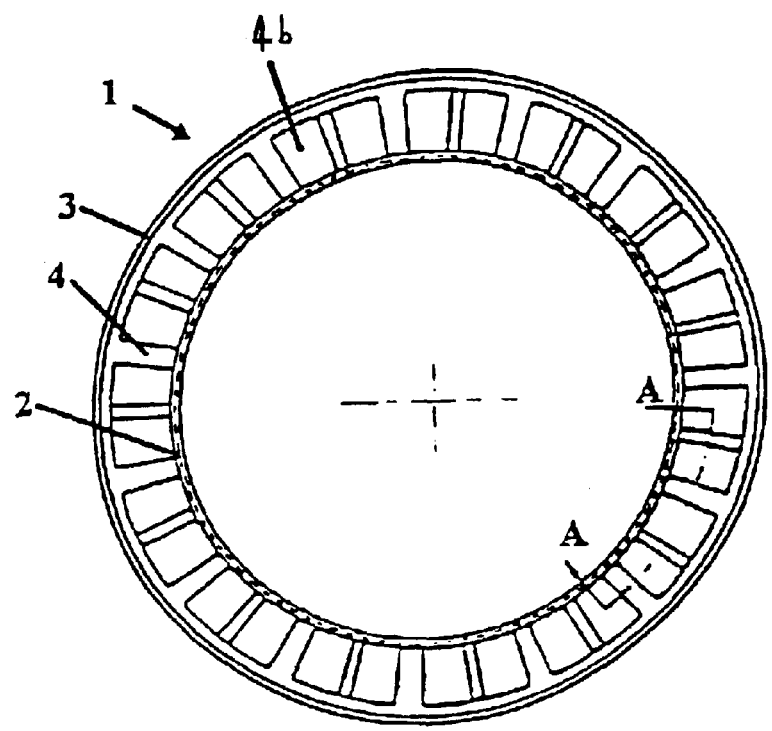
FIG. 1 is a side view of a safety support which can be used in the prediction method according to the invention.
Figure 2:
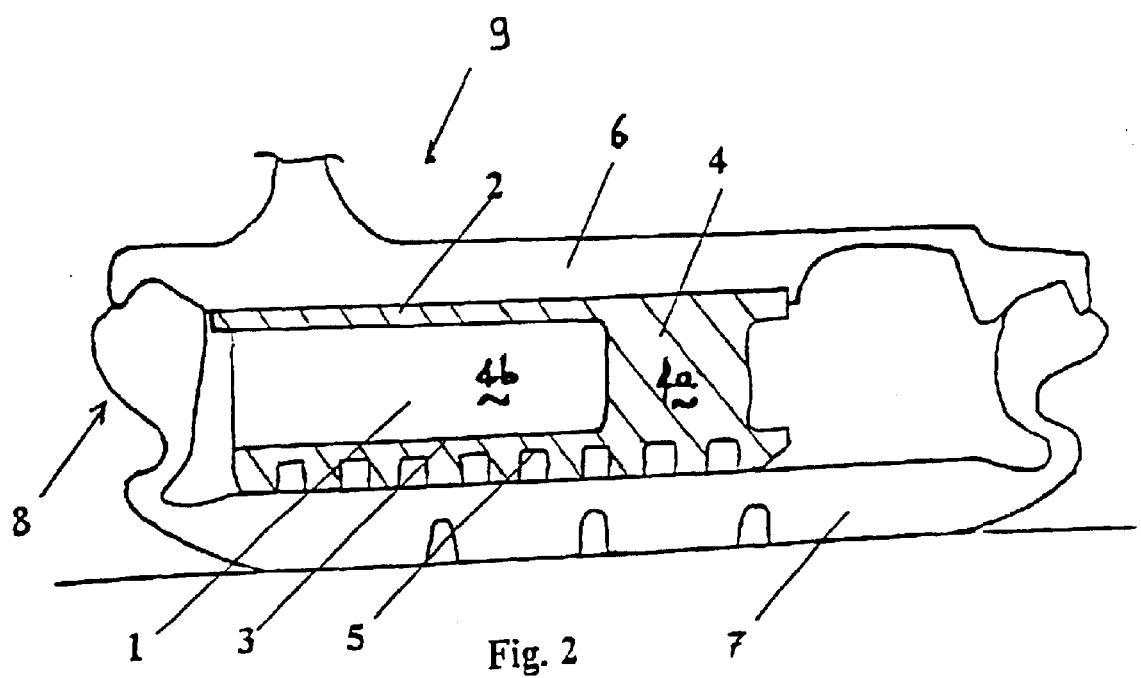
FIG. 2 is a view in axial section of a mounted assembly which comprises the support of FIG. 1 and which can be used in the prediction method according to the invention.

With reference to FIGS. 1 and 2, a support 1 which can be used to implement the prediction method according to the invention comprises essentially three parts:

a base 2, annular in shape overall, a crown 3, substantially annular, with longitudinal grooves 5 in its radially outermost wall (optionally), and an annular connection body 4 between the base 2 and the crown 3.

FIG. 2 illustrates in particular the function of the support 1 when it is mounted on a wheel rim 6, which is to support the tread 7 of a tire cover 8 in the event of a drop in the inflation pressure inside the mounted assembly 9 comprising the rim 6, the support 1, and the tire cover 8.

As can be seen in FIG. 2, the support 1 comprises a first solid part 4a of the annular body 4 and a second part 4b comprising recesses separated from each other by partitions 4a (see also FIG. 1) extending axially over substantially more than half of the annular body 4, opening out on the outside in a substantially axial direction. These partitions 4a are regularly spaced apart over the entire circumference of the annular body 4.

Figure 3:
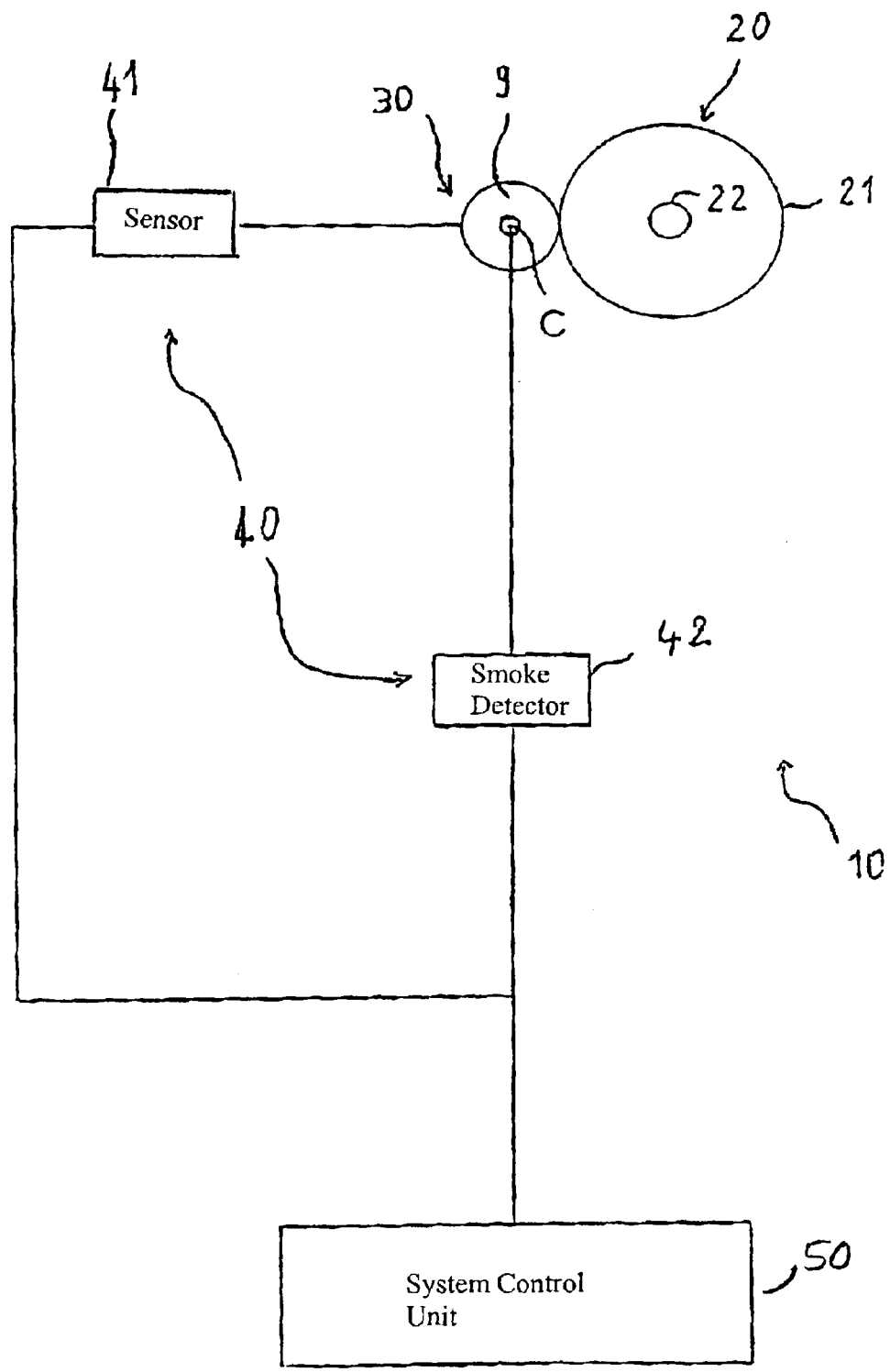
FIG. 3 is a block diagram illustrating the simplified structure of an installation according to the invention.

The main parts of an installation 10 according to the invention for predicting the flat-running distance, without substantial deterioration in the running conditions, of the mounted assembly 9 are shown schematically in FIG. 3.

The installation 10 comprises essentially:

a rolling road 20 comprising a test drum 21 mounted on a drive shaft 22 with a view to its driving in rotation, one or more running stations 30, each intended for the running on the test drum 21 of a mounted assembly 9, or of a safety support 1 mounted on a rim 6 (only one station 30 is shown in FIG. 3 for the purpose of simplification), detection means 40 connected to the running station or stations 30 and designed to detect at all times, during running "flat" on the test drum 21, items of information representing the effects caused by such running on the mounted assembly 9 (or on the support 1, according to circumstances), and a unit 50 for controlling the start-up of the running according to predetermined running parameters, in order to receive the items of information from the said means 40 and to store them, and to control the stoppage of the rolling if at least one of the items of information reaches a predetermined critical value.

Figure 4:
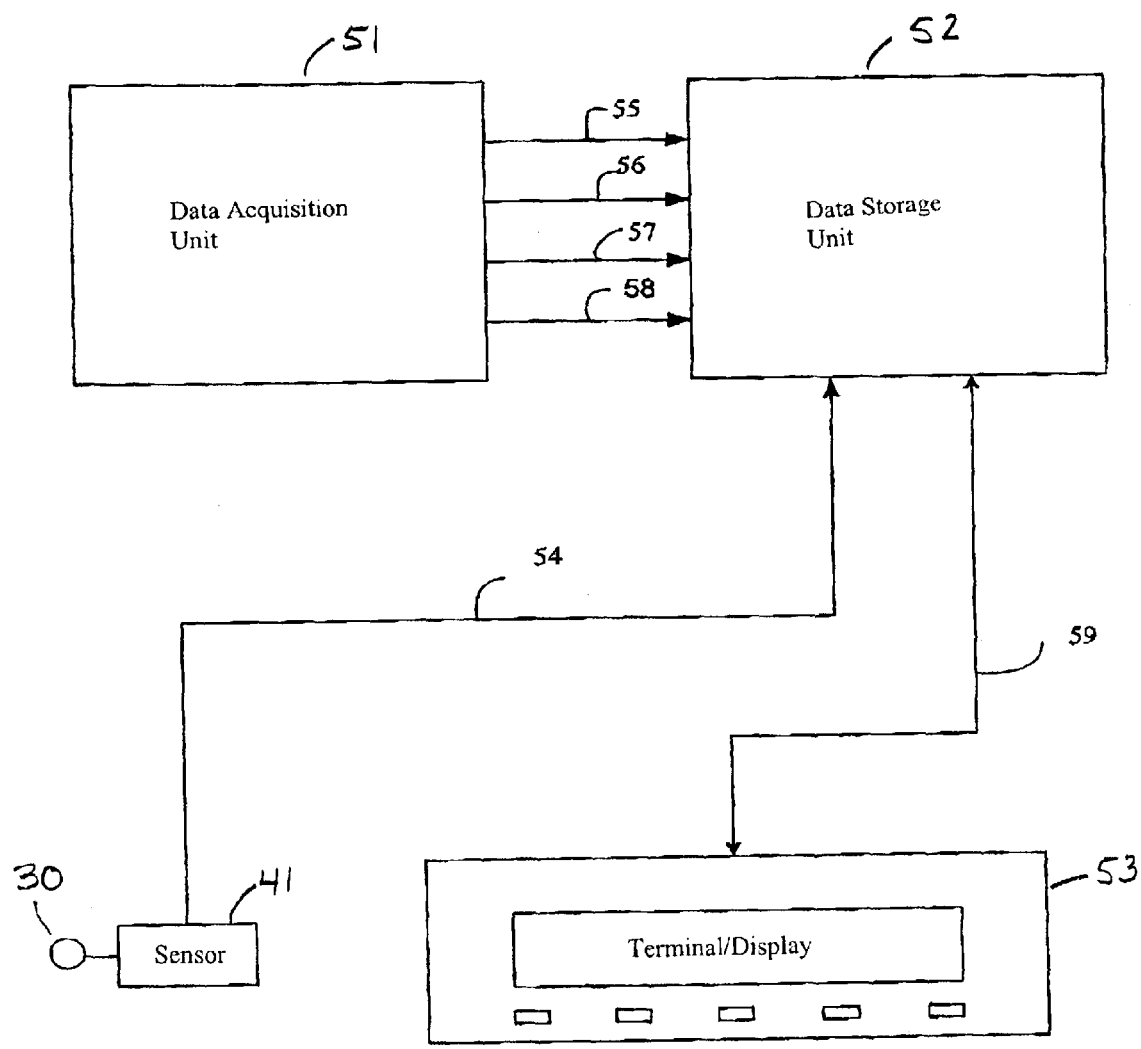
FIG. 4 is a block diagram illustrating the simplified structure of an example of a unit for controlling the starting of the running according to predetermined running parameters, comprising a running speed and a load to be applied to the support during running, in order to receive the information from the detection means and to store it, and to control the stopping of the running if at least one of the items of information reaches a predetermined critical value.

An example of the unit 50 is shown in more detail in FIG. 4.

It can be seen that the unit 50 is of the programmed microprocessor type, comprising:

a data acquisition unit 51 for the running station 30 coupled to the test drum 21;

a data storage unit 52 for monitoring and storing at least an item of information received from the detection means 40, such as the "loaded radius" received from a loading sensor 41 (also represented in FIG. 3), the data storage unit 52 receiving data from the data acquisition unit 51 and from the sensor 41; and a terminal/display unit 53 for the operator communicating bi-directionally (indicated schematically at 59) with the data storage unit 52 in order to display the change of the "loaded radius" as a function of the running time until a critical "loaded radius" is reached and to calculate and display the corresponding critical running distance.

In fact, the means 40 of detecting the running effects on the mounted assembly 9 (or on the support 1, according to the circumstances) comprise essentially a loading sensor 41 which is designed to supply at all times a "loaded radius" value which represents the mean radial loading of the support 1 during the running.

This "loaded radius" is measured at each second of running between a first point defining the center C of the wheel 6 and a second point defining the center of the contact surface between the tread 7 and the test drum 21.

As mentioned hereabove, the data storage unit 52 is designed to receive the data 55 to 58 from the data acquisition unit 51, which respectively correspond to the application to the test drum 21 of a, mounted assembly 9 (or of a support 1 mounted on a rim 6), to the start-up of the running of the mounted assembly 9 or of the support 1 on the test drum 21, to the selection of a given running speed V, and to the end of running.

Moreover, it can be seen in FIG. 4 that the data storage unit 52 is also designed to receive data 54 of "loaded radiuses" from the sensor 41, in order to monitor the evolution of the "loaded radius" as a function of time.

Figure 5:
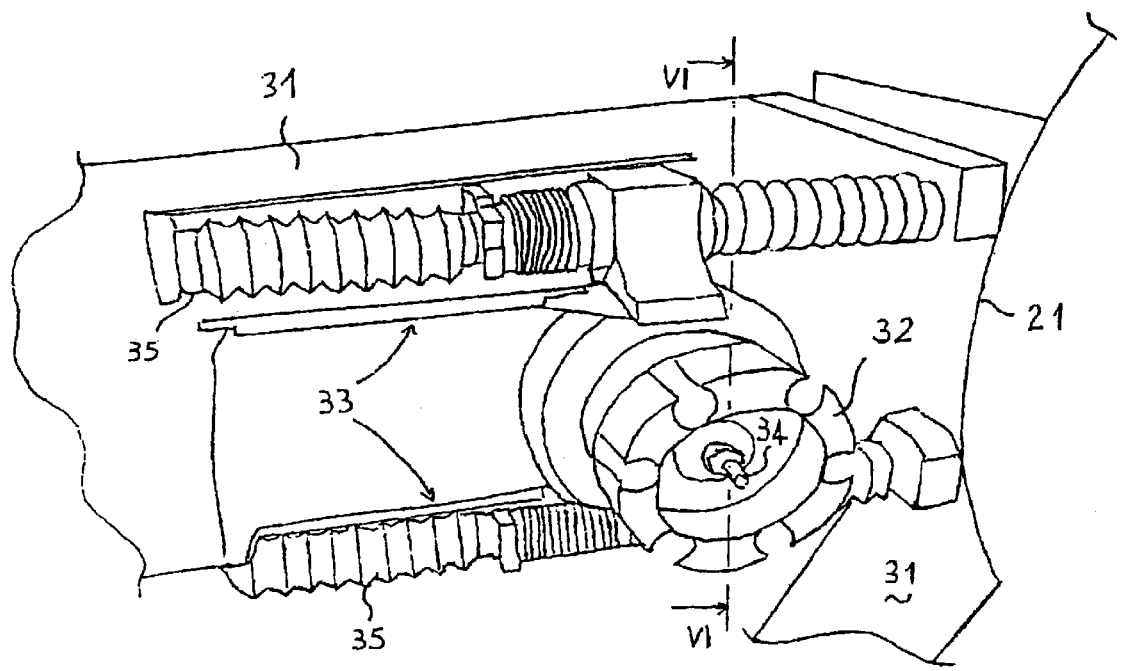
FIG. 5 is a schematic view of a running station of the installation of FIG. 3.

The running station 30 is shown in more detail in FIG. 5. It includes essentially a frame 31 on which a hub 32 is mounted which, in this example, is intended to receive the mounted assembly 9 or the rim 6 provided with the support 1 (only the hub 32 is shown for purposes of clarity) with a view to making the tire cover 8 or the support 1 run on the test drum 21. The hub 32 is mounted so as to be able to move in translation on the frame 31 by means of movement means 33, so as to allow the running of the tire cover 8 (or of the support 1, according to circumstances) on the test drum 21 according to a given load.

For this purpose, the axis of symmetry of the hub 32 is provided so as to be parallel to the drive shaft 22 (not visible in FIG. 4) of the test drum 21, and the hub 32 has bearings (not visible) to allow the rotation of the mounted assembly 9 or of the rim 6 provided with the support 1 in contact with the test drum 21.

In this exemplary embodiment of the invention, the rolling road 20 is such that the test drum 21 has a smooth running surface.

The hub 32 is provided, at its axis of symmetry, with a nozzle 34 or "valve nose", which projects axially in front of the hub 32 and which is intended to be connected to the wheel valve of the mounted assembly 9.

As can be seen in FIG. 5, the means 33 of moving the hub 32 have, in this exemplary embodiment, bellows 35 which are controlled by control means of the pneumatic type (not shown) to which they are connected, so that they can move from a retracted position, in which the tire cover 8 or the support 1 is distant from the test drum 21, to various running positions, in which the tire cover 8 (or the support 1 according to circumstances) is applied against the test drum 21.

As previously mentioned, the means 40 of detecting the running effects on the mounted assembly 9 (or on the support 1, according to the circumstances) comprise essentially a loading sensor 41 which is designed to supply at all times a "loaded radius" value which represents the mean radial loading of the support 1 during the running. This "loaded radius" is measured at each second of running between a first point defining the center C of the wheel 6 (FIG. 3) and a second point defining the center of the contact surface between the tread 7 and the test drum 21. More precisely, the sensor 41 is of the potentiometric type and is provided with a wire (not shown in FIG. 5) connected to the movement means 33 of the running station 30 so as to allocate a "loaded radius" value to each position of the station 30. By way of sensor 41, use is made for example of a sensor sold by the company ASM under the designation "WL10/250/10V/L10".

In the case of a running of the mounted assembly 9 on the test drum 21, the means 40 also include a smoke detector 42 (see FIGS. 3 and 6) which is designed to detect any presence of smoke by internal heating within the mounted assembly 9 during running (that is to say between the rim 6 and the tire cover 8). The smoke detector 42 is connected to the unit 50 so as to be able to transmit an alarm signal to it in the event of the detection of smoke.

The smoke detector 42 is connected to the internal end of the nozzle or "valve nose" 34 by suction means 43 provided inside the station 30 to suck the smoke generated inside the mounted assembly 9 in the direction of the detector 42.

Figure 6:
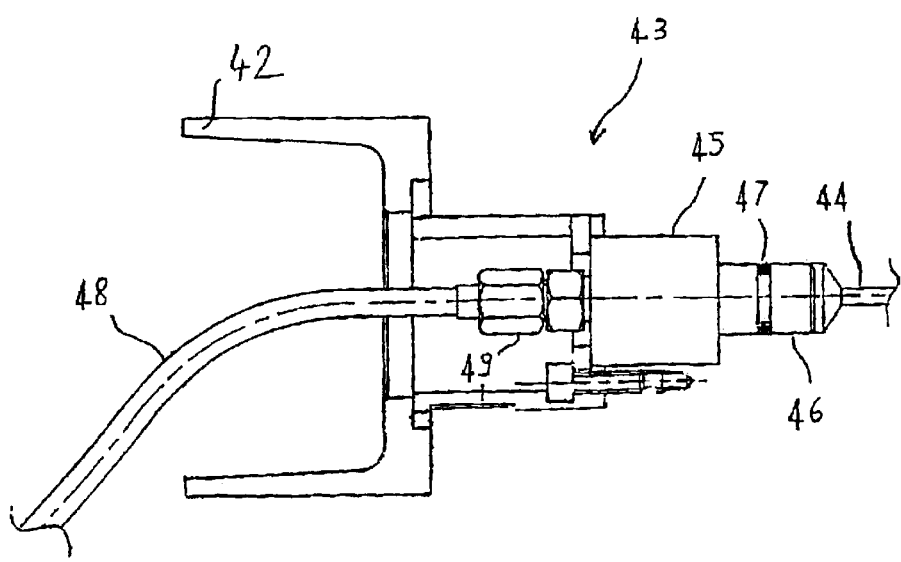
FIG. 6 is a detail view in section of an internal part of the running station along the plane VI—VI in FIG. 5.

As can be seen in FIG. 6, the suction means 43 comprise essentially, as from the nozzle 34, a tube 44 which is connected to the nozzle so as to communicate with the inside of the mounted assembly 9 in rotation, a rotating joint 45 connected to the tube 44 by means of a coupling 46 with an O-ring seal 47, and a pipe 48 which is connected to the rotating joint 45 by means of another coupling 49 and which opens into the smoke detector 42. A fan (not shown) is connected to this pipe 48 in order to afford the aforementioned suction.

The prediction method according to the invention can be implemented in the following manner, by means of the aforementioned installation.

Firstly, the application to the test drum 21 of a mounted assembly 9 (or of a support 1 mounted on a rim 6, according to circumstances), previously mounted on the hub 32, is controlled, by means of the automatic mechanism of the unit 50, provided for this purpose. This automatic mechanism has the effect of moving the running station 30 from a retracted position to a position of running on the test drum 21, so that the tread 7 of the tire cover 8 (or the support 1, according to circumstances) is applied against the test drum 21.

Reference should be made to the aforementioned patent document WO-A-00/76791 (U.S. 2002/0124924 A1) for the description of an example of a support 1 used.

Secondly, at a time to, the start-up of the running of the mounted assembly 9 or of the support 1 on the test drum 21 is controlled, at a given speed V and under a given load, by an automatic mechanism of the unit 50. The unit 50 displays the change in the mean "loaded radius" R (in mm) of the support 1 as a function of the running time t (in seconds), by means of the information which it receives from the loading sensor 41.

During a stabilization running time $t_1$, it appears that this "loaded radius" varies erratically and to an insignificant extent, essentially by creep because of its rotation at a relatively high speed and the stress resulting from the load applied. As from this time $t_1$, the loaded radius commences to decrease continuously and substantially, essentially by buckling.

On the basis of the "stabilized" loaded radius $R_1$ corresponding to the stabilization time $t_1$, the running is continued until the unit 50 indicates that the loaded radius R of the support 1 reaches a value $R_2$ such that $R_2=R_1+\Delta R$, where $\Delta R$ is a predetermined critical value of decrease in the loaded radius beyond which the support 1 is subjected to stresses and to heating liable to crack its partitions or to rupture them.

According to a preferred embodiment of the invention, there is used, as a criterion for stoppage (i.e., the decrease $\Delta R$ in the loaded radius as from the loaded radius corresponding to the stabilization time of approximately 15 min), a reduction in the loaded radius of 0.5 mm in 10 seconds following the 15 minutes of stabilization time, for a support having a height of 60 mm, a width of 110 mm and an inside diameter of 460 mm. In other words, this is a rate of reduction of the "stabilized" loaded radius over a given time interval.

As from the time value $t_2$ corresponding to the radius $R_2$ which is supplied by the unit 50, the running distance $d_2$ of the mounted assembly 9 (or of the support 1, according to circumstances) is calculated by the formula $d_2=V(t_2-t_0)$, which thus represents a prediction of the maximum running distance, without substantial deterioration in the running conditions, of the mounted assembly 9.

Experience has shown that the graphical characteristics of the loaded radius of the support as a function of the running time exhibit, just before the appearance of substantial damage in the support 1, such as ruptures of the partitions 4a, a reversal point substantially at the critical time $t_2$; that is to say, a reversal of the direction of variation of the slope of the graphic characteristic for $t>t_2$ representing a higher and higher rate of loading of the support 1, which rapidly leads to the rupture of the support 1.

In parallel to this monitoring of the change in the loaded radius of the support 1, the information received from the smoke detector 42 is surveyed by means of the unit 50 and the stoppage of the running is controlled, by means of the unit 50, when the unit 50 addresses the alarm signal indicating the presence of smoke inside the mounted assembly 9.

It should be noted that the suction means 43 also make it possible to suck away any air currents or vortices inside the mounted assembly 9 which would not make it possible to detect the presence of smoke, in order to regulate the pressure of the inflation air to a zero or reduced value.

Figure 7:
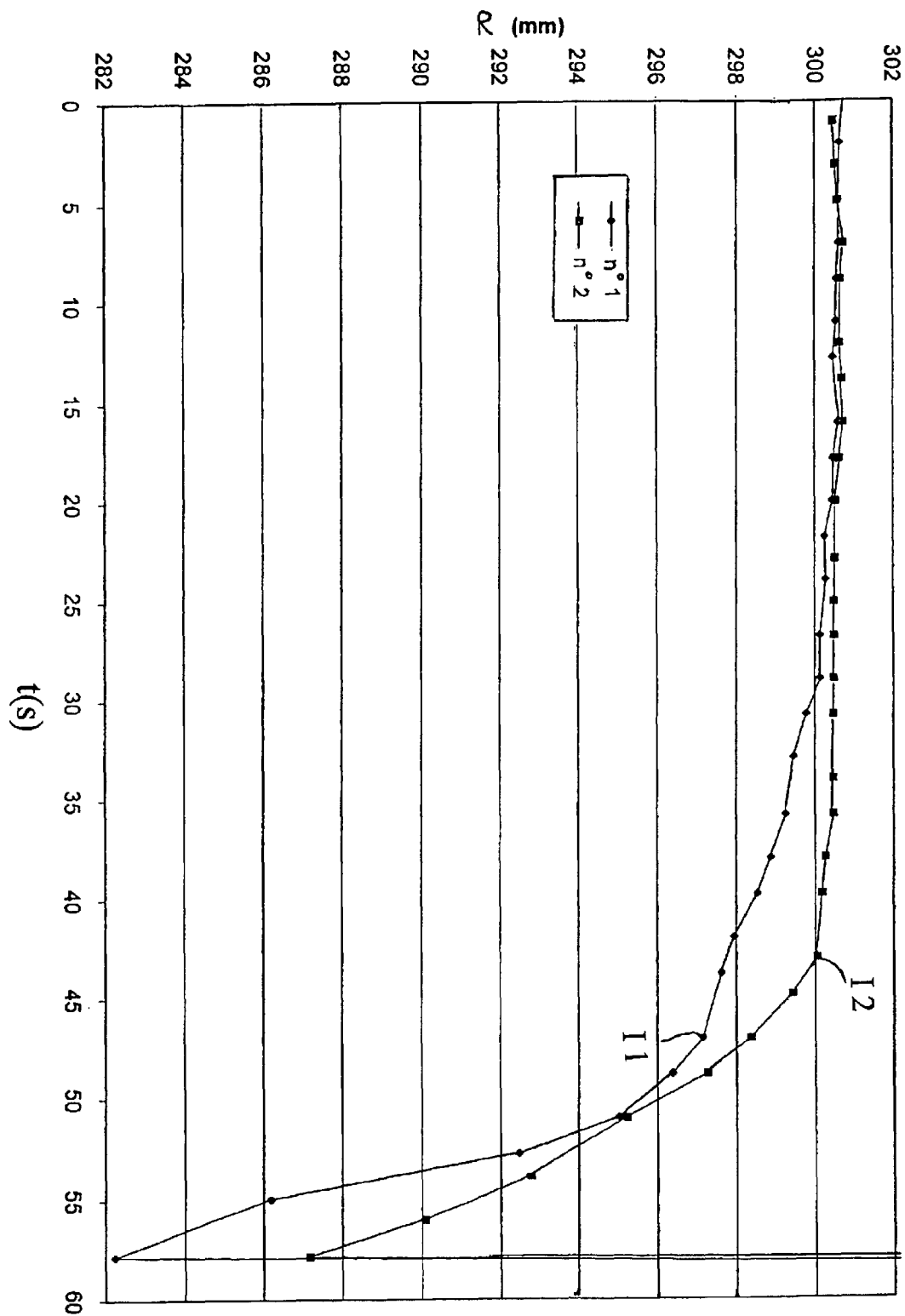
FIG. 7 is a graph illustrating the change as a function of time, at the end of running flat, of two characteristics representing the radial loading of a support.

FIG. 7 illustrates the graphical characteristics obtained for a running at zero internal pressure of two identical tested mounted assemblies (each having a support as described in the patent document WO-A-00/76791 (U.S. 2002/0124924 A1)). More precisely, the two graphs in FIG. 7 concern the last 60 seconds before rupture of the support (by buckling and excessive internal heating). The two mounted assemblies were tested at two different speeds, one at 100 km/h and the other at 88 km/h. The dimensions of each mounted assembly were 225/700 R480, and the load applied was 430 daN. A rolling road having a "2 P/V" smooth test drum characterized by a development (circumference) of 5 meters was used in the tests. The ambient temperature of the tests was 25° C. The stoppage criterion used was a decrease $\Delta R$ in the loaded radius of 0.5 mm in 10 seconds following 15 minutes of stabilization time.

The graph of the loaded radius relating to the test at 88 km/h (Test No. 1) has a reversal point I1, beyond which the rate of decrease in the slope of the loaded radius increases suddenly until the rupture of the support, which occurs about ten seconds later. This point I1 corresponds to a prediction of maximum running distance, without substantial deterioration in the running conditions, equal to 384 km for the mounted assembly.

In a similar manner, the graph of the loaded radius relating to the test at 100 km/h (Test No. 2) has a reversal point I2, which corresponds to a prediction of a maximum running distance, without substantial deterioration in the running conditions, of 208 km for the mounted assembly.

Although the invention has been described and illustrated herein by reference to specific embodiments thereof, it will be understood that such embodiments are susceptible of modification and variation without departing from the inventive concepts disclosed. All such modifications and variations, therefore, are intended to be encompassed within the spirit and scope of the appended claims.

What is claimed is:

1. A method of predicting the maximum running distance without substantial deterioration in the running conditions, at a reduced or zero inflation pressure, of a mounted assembly, comprising a wheel rim, a safety support mounted on the rim and a tire cover mounted on the rim around the support, the support supporting the tread of the tire cover during the running, wherein said method comprises running on at least one running surface either (1) the mounted assembly at a reduced or zero inflation pressure or (2) the support mounted on the rim, from a time $t_0$, at a given temperature, at a given load and with a constant speed V, so that the center of the rim is a point which is substantially invariant during said running, monitoring the variation in a variable R representing the radial loading of the support as a function of the reduced or zero pressure running time t, and wherein the method comprises, during said running, implementing the following sequence of steps:

(i) determining a value $R_1$ attained by said variable R at the end of a predetermined stabilization time $t_1$ which is such that the direction of variation of said variable R represents a radial loading of said support increasing overall beyond the stabilization time $t_1$, then (ii) determining a critical running time $t_2$ ($t_2>t_1$) at the end of which said variable R reaches a critical value $R_2$ such that $R_2=R_1+\Delta R$, $\Delta R$ being a value representing a critical increase in the loading of the support with respect to the value $R_1$ at the end of the stabilization time $t_1$, and then (iii) making the running time $t_2$ correspond to a distance $d_2$, with $d_2=V(t_2-t_0)$, representing a prediction of the maximum running distance without substantial deterioration in the running conditions of the mounted assembly.

2. The prediction method according to claim 1, wherein the value $\Delta R$ is such that, at time $t_2$, the rate of increase |dR/dt| in the loading of the support is greater than a given critical threshold.

3. The prediction method according to claim 1 or 2, wherein the mounted assembly is run on the at least one running surface.

4. The prediction method according to claim 3, further comprising estimating that the maximum running distance, without substantial deterioration in the running conditions, is attained just before smoke is detected inside the mounted assembly.

5. The prediction method according to claim 1 or 2, wherein the support mounted on the rim is run on the at least one running surface.

6. The prediction method according to claim 1, wherein step (ii) is implemented following the variation in said variable R from the time $t_1$, and predicting that the variable R attains the critical value $R_2$ at the critical time $t_2$ substantially when the instantaneous acceleration of the loading $d^2R/dt^2$ of the support passes through a zero value.

7. The prediction method according to claim 1, wherein said variable R representing the radial loading of the support corresponds to the mean radius of the support during loading, the radius being measured between a first point defining the center of the rim and a second point defining the center of the contact surface between the running surface and the tire cover or the radially external face of the support, according to whether the tire cover or the support is in contact with the running surface.

8. The prediction method according to claim 1, wherein the running surface is in the form of a cylinder with a circular cross section.

9. The prediction method according to claim 8, wherein the cylinder comprises a test drum having a smooth running surface.

10. The prediction method according to claim 8, wherein the cylinder comprises a test drum whose running surface has a plurality of projecting and/or recessed irregularities on its circumference.

11. An installation for predicting the maximum running distance without substantial deterioration in the running conditions, at a reduced or zero pressure, of a mounted assembly, comprising a wheel rim, a safety support mounted on the rim and a tire cover mounted on the rim around the support, the support supporting the tread of the tire cover during the running, said installation comprising:

at least one running surface, and one or more running stations which are each intended for the running on said at least one running surface either of (1) said mounted assembly or (2) said safety support mounted on a wheel rim, from a time $t_0$, at a given temperature, at a given load and with constant speed V, the center of the mounted assembly or of the support being a point which is substantially invariant during the running on said at least one running surface;

detection means connected to said at least one running station for detecting at all times, during the running on said at least one running surface, information representing the effects caused by said running, comprising at least one item of information representing the radial loading of the support at all times; and a unit for controlling the starting of the running according to predetermined running parameters, comprising a running speed V and a load to be applied to the support during running, in order to receive said information from said detection means and to store said information, and to control the stopping of the running if at least one of said items of information reaches a predetermined critical value.

12. An installation according to claim 11, wherein said detection means comprise a loading sensor which is designed to provide at all times a support radius value during loading which represents the mean radial loading of said support during running, said radius during loading being measured between a first point defining the center of the rim and a second point defining the center of the contact surface between said running surface and the tire cover or the support, whichever is being run on said running surface.

13. An installation according to claim 11 or 12, wherein said detection means comprise a smoke detector for detecting the presence of smoke inside the mounted assembly during running at reduced or zero pressure, and further comprising suction means provided inside the running station or stations in order to suck the air included inside the mounted assembly in the direction of said smoke detector.

* * * * *

UNITED STATES PATENT AND TRADEMARK OFFICE
CERTIFICATE OF CORRECTION

PATENT NO. : 6,820,015 B2
DATED : November 16, 2004
INVENTOR(S) : Laurent Ferres et al.

It is certified that error appears in the above-identified patent and that said Letters Patent is hereby corrected as shown below:

Title page,
Item [56], References Cited, OTHER PUBLICATIONS,
delete "Patent Abstract of Japan for Publication No. 03082931, Aug. 2001" add
-- Patent Abstract of Japan for Publication No. 03082931, Apr. 1991 --.

Column 5,
Line 49, "the," should read -- the --.

Column 7,
Line 27, "a," should read -- a --.

Signed and Sealed this

Seventeenth Day of January, 2006

JON W. DUDAS
*Director of the United States Patent and Trademark Office*